United States Patent
Yamazaki et al.

(10) Patent No.: US 6,877,809 B2
(45) Date of Patent: Apr. 12, 2005

(54) CHILD CAR SEAT

(75) Inventors: Kojiro Yamazaki, Saitama (JP);
Nobuaki Takamizu, Saitama (JP);
Yoshihiro Tanaka, Osaka-Fu (JP)

(73) Assignee: Combi Corporation, Tokyo-Tu (JP)

( * ) Notice: Subject to any disclaimer, the term of this patent is extended or adjusted under 35 U.S.C. 154(b) by 0 days.

(21) Appl. No.: 09/974,049

(22) Filed: Oct. 11, 2001

(65) Prior Publication Data

US 2002/0041117 A1 Apr. 11, 2002

(30) Foreign Application Priority Data

Oct. 11, 2000 (JP) .................................... 2000-310999
Oct. 11, 2000 (JP) .................................... 2000-311006
Oct. 11, 2000 (JP) .................................... 2000-311009

(51) Int. Cl.$^7$ .............................................. B60N 2/28
(52) U.S. Cl. ................................. 297/253; 297/256.13
(58) Field of Search ............................ 297/250.1, 253, 297/256.13, 256.1, 357

(56) References Cited

U.S. PATENT DOCUMENTS

| 253,829 | A | * | 2/1882 | Anderson .................... 297/357 |
| 294,198 | A | * | 2/1884 | Clark .......................... 297/357 |
| 2,308,315 | A | | 1/1943 | Smith |
| 2,777,502 | A | * | 1/1957 | Travis ...................... 297/250.1 |
| 3,325,213 | A | * | 6/1967 | Levy ........................... 297/467 |
| 3,404,917 | A | * | 10/1968 | Smith ...................... 297/256.1 |
| 3,779,599 | A | | 12/1973 | Gottfried |
| 4,461,510 | A | * | 7/1984 | Cunningham et al. ... 297/250.1 |
| 5,383,708 | A | * | 1/1995 | Nagasaka et al. ........ 297/250.1 |
| 5,695,243 | A | * | 12/1997 | Anthony et al. ......... 297/250.1 |
| 5,845,968 | A | * | 12/1998 | Lovie ...................... 297/256.1 |
| 6,334,652 | B1 | * | 1/2002 | Chen et al. .................. 297/357 |
| 6,481,794 | B1 | * | 11/2002 | Kassai et al. ............. 297/250.1 |

FOREIGN PATENT DOCUMENTS

| EP | 0 197 910 | | 10/1986 |
| EP | 0 560 184 A1 | | 9/1993 |
| EP | 1 033 280 A2 | | 9/2000 |
| FR | 2 413 896 | | 8/1979 |
| FR | 2 698 832 | | 6/1994 |
| SE | WO 99 37499 | * | 7/1999 |
| WO | 97/39913 | | 10/1997 |

* cited by examiner

Primary Examiner—Peter M. Cuomo
Assistant Examiner—Joseph Edell
(74) Attorney, Agent, or Firm—Birch, Stewart, Kolasch & Birch, LLP

(57) ABSTRACT

A child car seat (10) has a seat bottom (11) to be set on the seat of a vehicle, and a seat back (12) capable of turning relative to the seat bottom (11). Straps (40) having back end parts connected to an anchoring member (42) is extended along the bottom surface of the seat bottom (11). The length of parts of the straps (40) between the seat bottom (11) and the anchoring member (42) is adjusted by sliding a strap tightening device (41) along the straps (40). The strap tightening device (41) is engaged with a step (50) formed in the front end of the seat bottom (11) to hold the seat bottom (11) securely on the seat of a vehicle by the straps (40).

22 Claims, 13 Drawing Sheets

CHILD CAR SEAT

BACKGROUND OF THE INVENTION

1. Field of the Invention

The present invention relates to a child car seat to be installed on a seat of a vehicle and, more particularly, to a child car seat capable of being firmly fixed on a seat of a vehicle.

2. Description of the Related Art

A known child car seat has a seat bottom, a seat back turnable relative to the seat bottom, and a strap connected to the seat bottom and provided at its back end with an anchoring member. The anchoring member is thrust in a seat of a vehicle to fix the child car seat on the seat of the vehicle.

Thus the child car seat is fixed on the seat of the vehicle simply by thrusting the anchoring member connected to the strap in the seat of the vehicle. However, it is difficult to fix the child car seat securely on the seat if the strap is excessively long. The anchoring member cannot be thrust in the seat of the vehicle if the strap is excessively short.

Meanwhile, a child car seat provided with a headrest capable of being easily operated for positional adjustment has been desired. Furthermore, a child car seat having a seat bottom and a seat back capable of being set at an appropriate angle to the seat bottom has been desired.

SUMMARY OF THE INVENTION

The present invention has been made in view of those problems and it is therefore an object of the present invention to provide a child car seat having a seat bottom, a seat back, a headrest and a strap provided with an anchoring member, capable of being securely fixed on a seat of a vehicle by thrusting the anchoring member in the seat of the vehicle, facilitating the positional adjustment of the headrest, and enabling the proper adjustment of the angular position of the seat back relative to the seat bottom.

According to the present invention, a child car seat to be installed on a seat of a vehicle includes a seat bottom to be mounted on the seat of a vehicle, a seat back connected to the seat bottom and capable of turning relative to the seat bottom, and a strap extending between the front end and the back end of the seat bottom and provided at the back ends with an anchoring member to be inserted into the seat of a vehicle; wherein a strap tightening device capable of engaging the seat bottom is slidably connected to a front part of the strap.

In the child car seat according to the present invention, the strap is extended backward from the back end of the seat bottom, and the anchoring member connected to the strap is inserted into and fastened to the seat. The strap tightening device is slid along the strap to reduce the working length of the strap, so that slack in the strap can be taken up. The strap tightening device engages a stepped part of the seat bottom to fix the seat bottom securely on the seat of the vehicle.

In this child car seat according to the present invention, the strap may be extend along a back surface of the seat bottom In this child car seat according to the present invention, a stepped part with which the strap tightening device engages, is formed in the front end of the seat bottom.

In this child car seat according to the present invention, the seat bottom may be provided with a recess capable of housing the anchoring member therein.

In this child car seat according to the present invention, the recess is formed in the bottom surface of the seat bottom.

According to the present invention, a child car seat includes a seat bottom, a seat back connected to the seat bottom and capable of turning relative to the seat bottom, a headrest slidably connected to the seat back, and a pair of side supports connected to the opposite ends of the headrest so as to be turnable, wherein a plurality of stopping grooves are formed in the opposite sides of the seat back in a vertical arrangement, and each of the side supports has a base end portion provided with stopping parts capable of being engaged in and disengaged from the stopping grooves.

In the child car seat according to the present invention, the side supports are turned relative to the headrest to disengage the stopping parts from the stopping grooves. Then the headrest is moved along the seat back to adjust the position of the headrest on the seat back, and then the side supports are turned to engage the stopping parts in the stopping grooves and, consequently, the headrest and the side supports are fixed on the seat back.

In the child car seat according to the present invention, the base end portion of each side support may be provided with a positioning projection, and the headrest may be provided on the opposite sides with positioning recesses in which the positioning projections of the side supports are engaged.

In the child car seat according to the present invention, a plurality of positioning recesses may be formed on each of the opposite sides of the headrest.

In the child car seat according to the present invention, the stopping parts of each side support are engaged in the stopping grooves of the seat back when the positioning projection of each side support engages in the positioning recess of the headrest.

In the child car seat according to the present invention, a strap may extend between the front end and the back end of the seat bottom and provided at the back end with an anchoring member to be inserted into the seat of a vehicle, and a strap tightening device capable of engaging the seat bottom may be slidably connected to a front part of the strap.

In the child car seat according to the present invention, the seat bottom may be provided with a first projection, and the seat back may be provided with a second projection capable of engaging the first projection to determine a limit of angle between the seat bottom and the seat back.

According to the present invention, a child car seat includes a seat bottom, and a seat back connected to the seat bottom and capable of turning relative to the seat bottom, wherein the seat bottom is provided with a first projection, and the seat back is provided with a second projection capable of engaging the first projection to determine a limit of angle between the seat bottom and the seat back.

In the child car seat according to the present invention, the first projections of the seat bottom and the second projections of the seat back are engaged when the seat back is folded down on the seat bottom. When the seat back is folded further down, the second projections climb over the first projections and the seat back is set at an angle to the seat bottom within the limit of angle.

In the child car seat according to the present invention, the seat bottom may be provided with slots, and the seat back may be provided with connecting projections capable of being engaged in the slots of the seat bottom so as to be movable relative to the seat bottom.

In the child car seat according to the present invention, the first projection may be formed on the inner surface of the seat bottom, and the second projection may be formed in the outer surface of the seat back.

In the child car seat according to the present invention, the second projection may be capable of climbing over the first projection.

DESCRIPTION OF THE PREFERRED EMBODIMENTS

Preferred embodiments of the present invention will be described hereinafter with reference to the accompanying drawings.

First Embodiment

A child car seat in a first embodiment according to the present invention is shown in FIGS. 1 to 11.

First, the child car seat 10 in the first embodiment will be generally described with reference to FIGS. 5 to 7.

Figure 5:
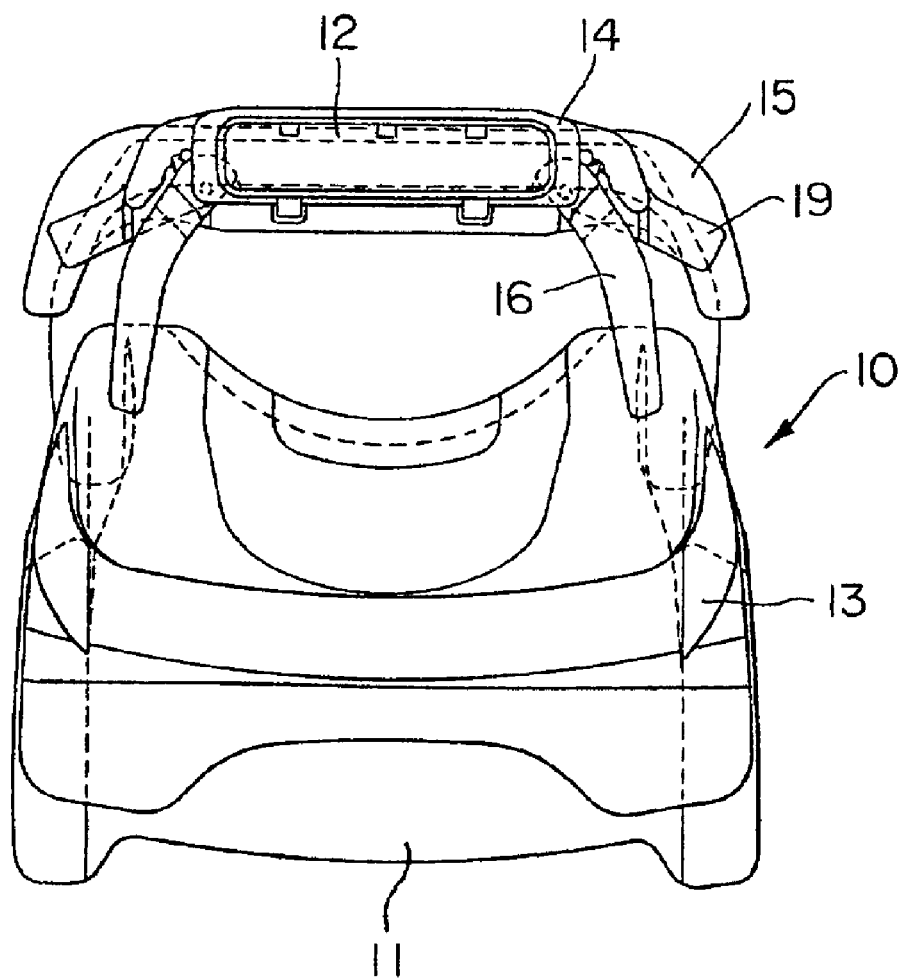
FIG. 5 is a plan view of the child car seat.
Figure 6:
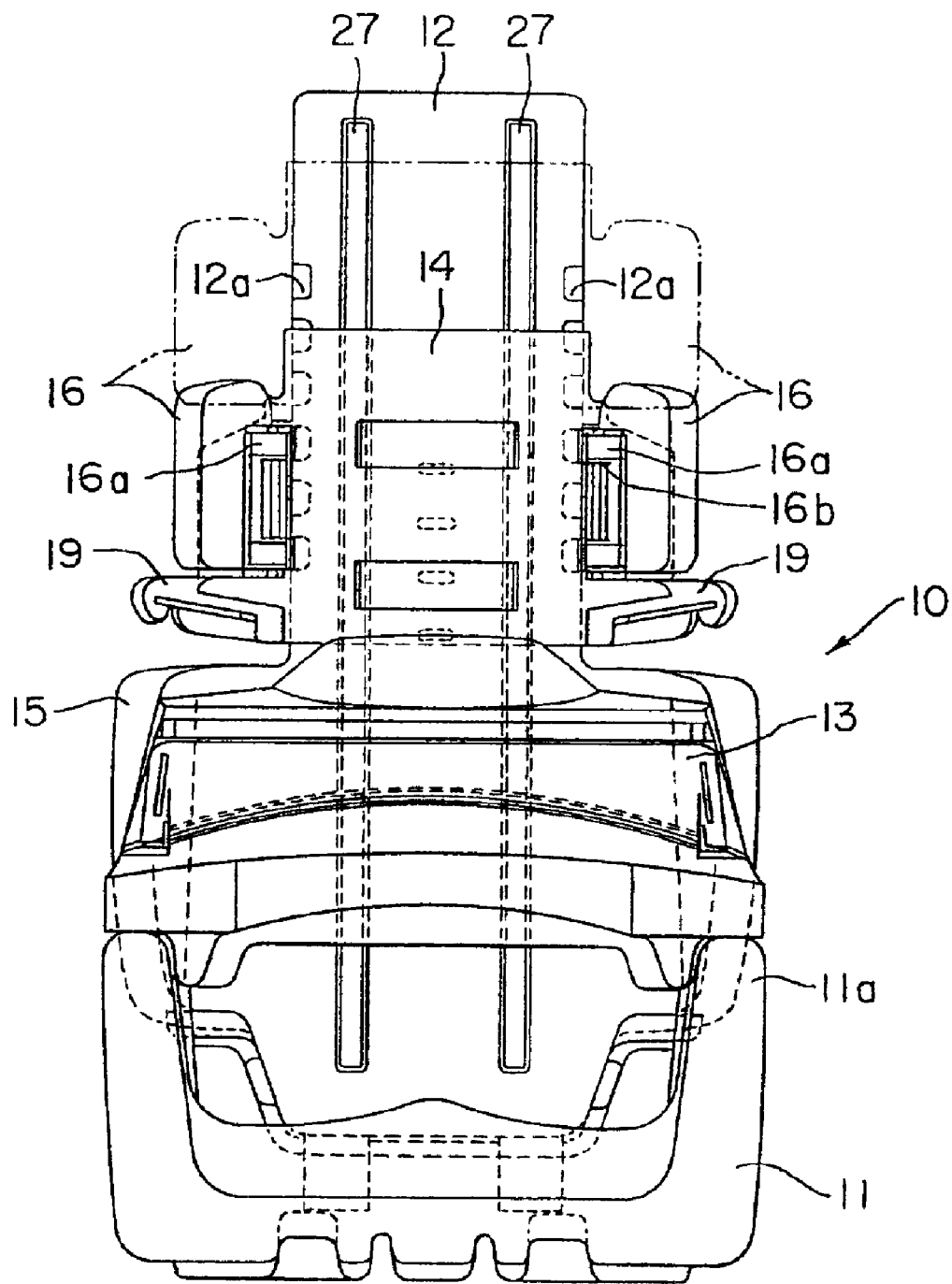
FIG. 6 is a front elevation of the child car seat.
Figure 7:
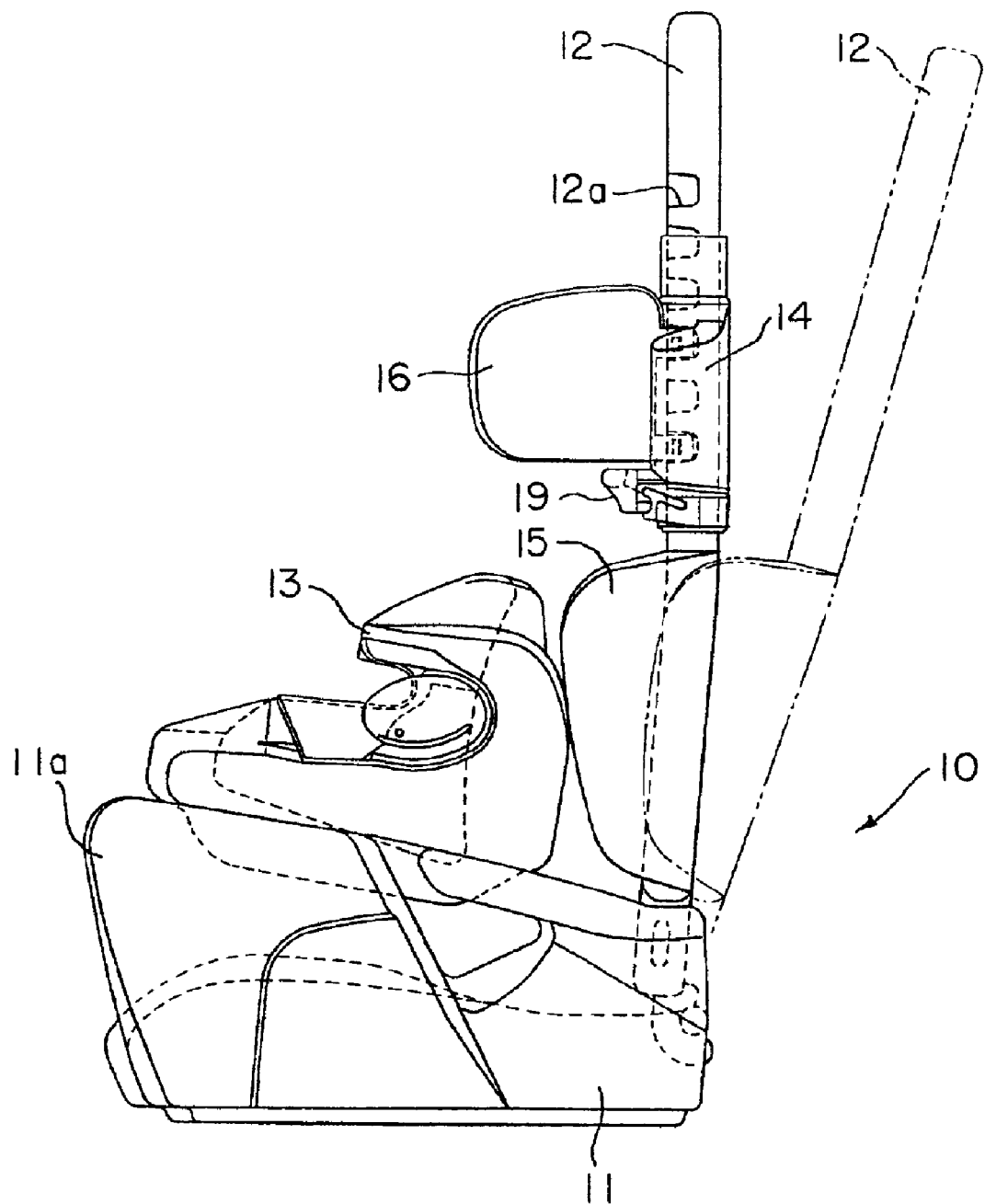
FIG. 7 is a side elevation of the child car seat.

Referring to FIGS. 5 to 7, the child car seat 10 has a seat bottom 11, a seat back 12 connected to the seat bottom 11 and capable of turning relative to the seat bottom 11, and a headrest 14 slidably connected to the seat back 12. The seat bottom 11 is attached to a seat of a vehicle S (FIG. 10). A little child K (FIGS. 15A to 15C) is seated on the seat bottom 11.

A pair of side supports 16 are connected to the opposite side ends of the headrest 14 so as to be turnable relative to the headrest 14. The angular position of the side supports 16 is adjusted according to the mode of use. A plurality of stopping grooves 12a are formed in the opposite side parts of the seat back 12 in a vertical arrangement, and each of the side supports 16 has a base end portion 16b provided with stopping parts 16a capable of being engaged in and disengaged from the stopping grooves 12a of the seat back 12.

As mentioned above, the seat back 12 is turnable relative to the seat bottom 11. A pair of guard panels 15 are attached to a lower part of the seat back 12 to hold the back of the child K laterally. The seat back 12 is provided with guide rails 27 for guiding the headrest 14 on its front surface.

The headrest 14 protects the head of the child K from danger. The headrest 14 is able to slide along the seat back 12 for positional adjustment. The stopping parts 16a of the pair of side supports 16 are engaged in the stopping grooves 12a of the seat back 12 to hold the headrest 14 securely at a desired position on the seat back 12. Belt guides 19 are formed in a lower part of the headrest 14 to guide a seat belt connected to the seat of a vehicle S.

Figure 8:
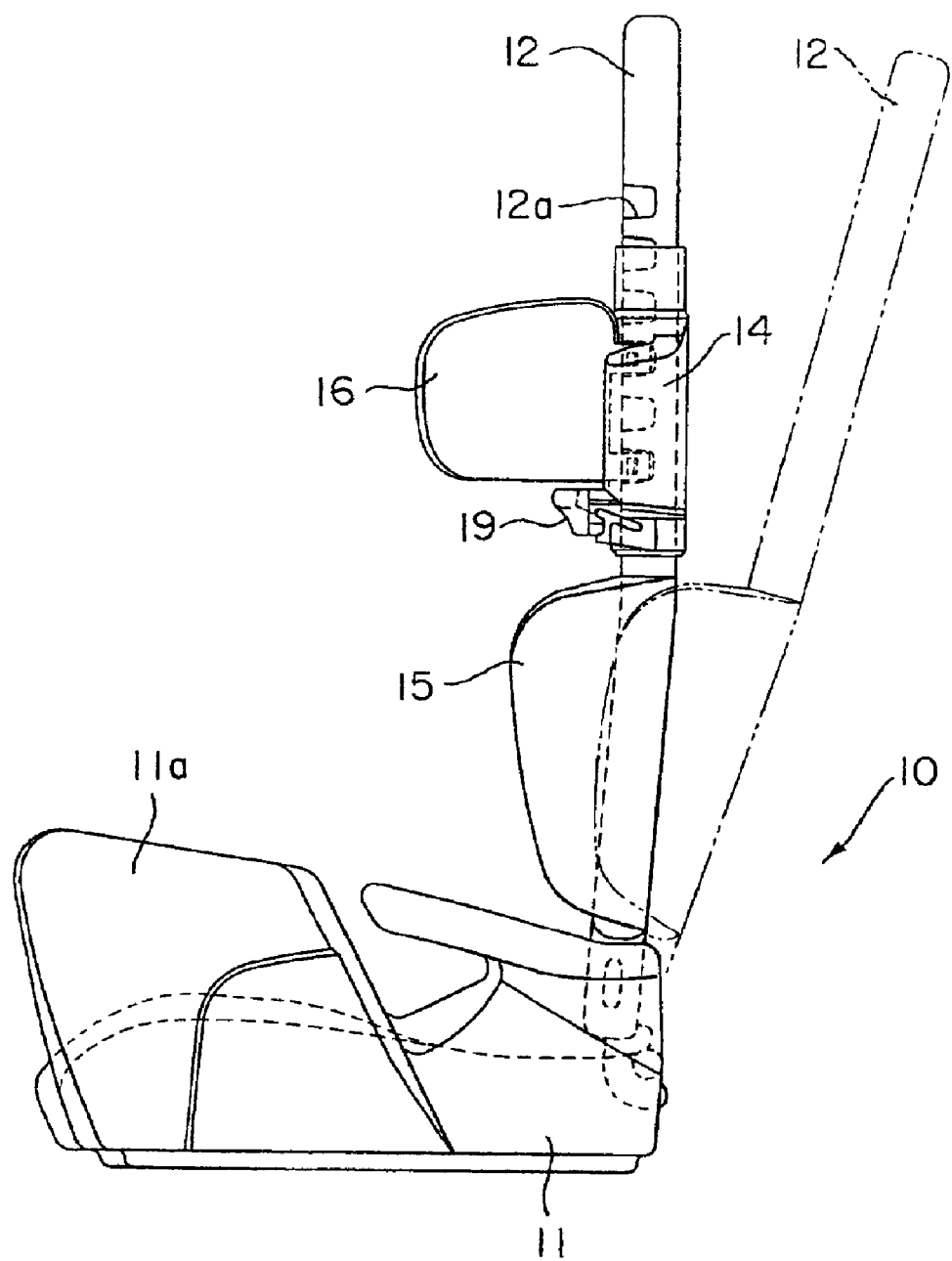
FIG. 8 is a side elevation of a child car seat in a modification of the child car seat in the first embodiment.

Side walls 11a of the seat bottom 11 secure the loins of the child K seated on the seat bottom 11. An impact shield 13 is mounted on the side walls 11a. The impact shield 13 is dispensable and may be omitted as shown in FIG. 8.

A combining structure for combining the seat back 12 and the headrest 14 will be described with reference to FIGS. 3 and 4.

Figure 1:
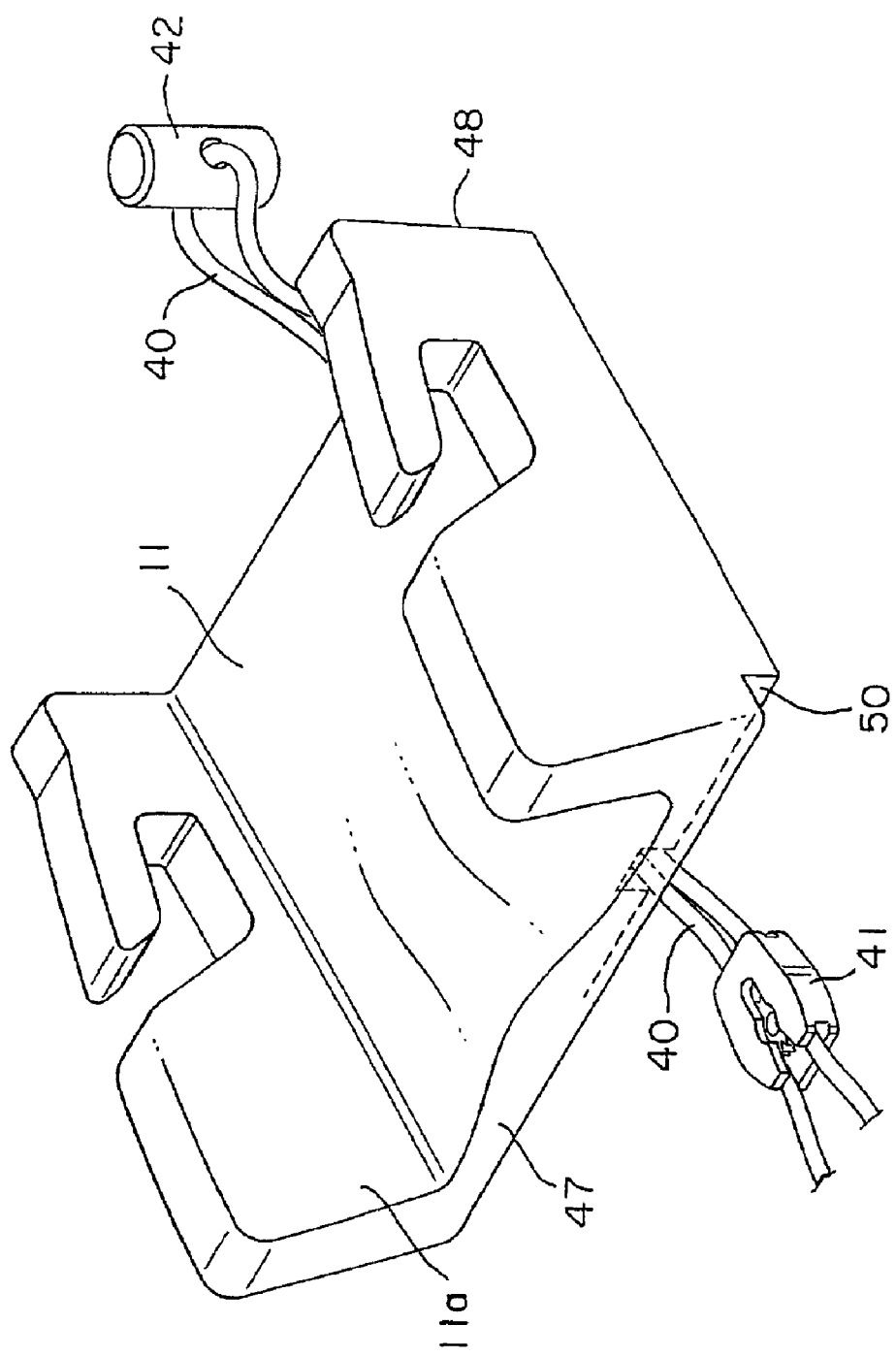
FIG. 1 is a perspective view of a child car seat in a first embodiment according to the present invention.
Figure 2:
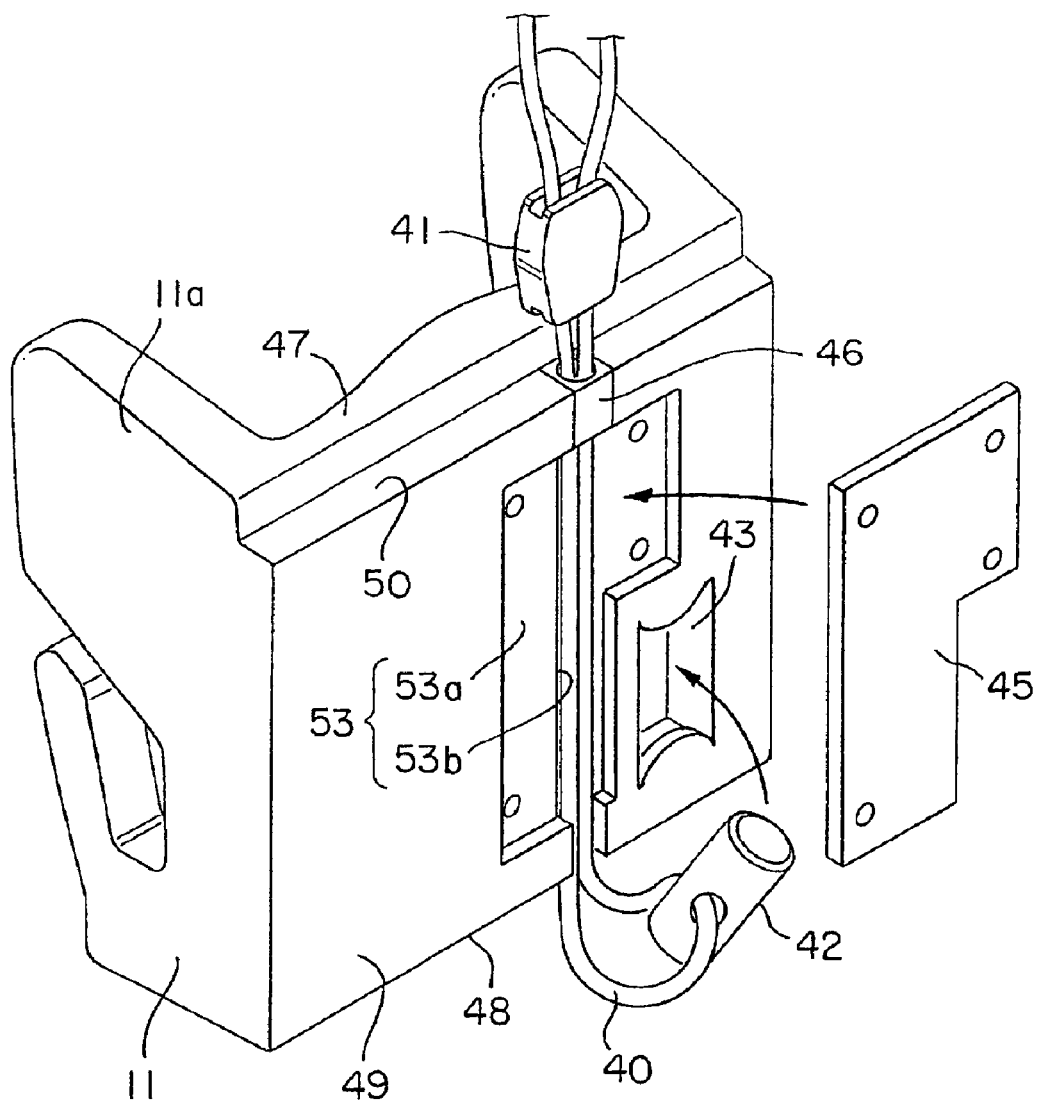
FIG. 2 is a perspective back view of a seat bottom.
Figure 3:
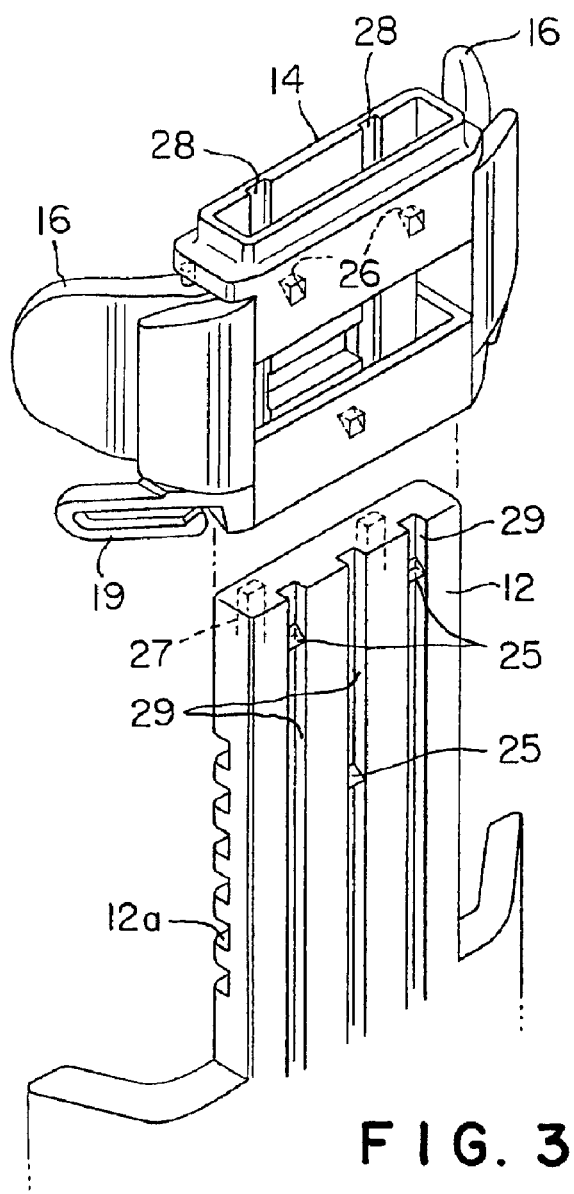
FIG. 3 is a perspective view of a headrest setting structure for setting a headrest on a seat back.
Figure 4:
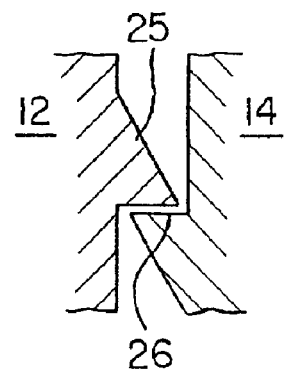
FIG. 4 is a sectional view of a stopping projection formed on the seat back and a stopping projection formed on the headrest.

Referring to FIGS. 3 and 4, the seat back 12 is provided with the guide rails 27 on its front surface, and guide grooves 29 in its back surface. Stopping projections 25 are formed in the guide grooves 29.

The headrest 14 is provided with guide grooves 28 in which the guide rails 27 engage in the inner surface of a front wall thereof. The headrest 14 is provided with stopping projections 26 on the inner surface of a back wall thereof. The projections 26 slides along the guide grooves 29 of the seat back 12 and engage the stopping projections 25 to prevent the headrest 14 from coming off the seat back 12.

As shown in FIGS. 3 and 4, the headrest 14 is put on the seat back 12 from above the seat back 12 such that the guide rails 27 of the seat back 12 are fitted in the guide grooves 28 of the headrest 14, and the stopping projections 26 engage in the guide grooves 29 of the seat back 14. The headrest 14 is moved down along the seat back 12 so that the stopping projections 26 of the headrest 14 climb over the stopping projections 25. The upward movement of the headrest 14 relative to the seat back 12 is limited by the engagement of the stopping projections 25 and 26, so that the headrest 14 is unable to come off the seat back 14.

A fixing structure for fixing the child car seat 10 on the seat of a vehicle S will be described with reference to FIGS. 1, 2 and 9 to 11.

Figure 10A:
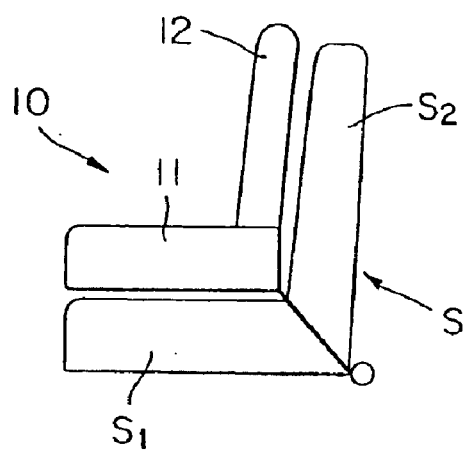
FIGS. 10A and 10B are schematic views of assistance in explaining a method of installing the child car seat in the first embodiment.
Figure 10B:
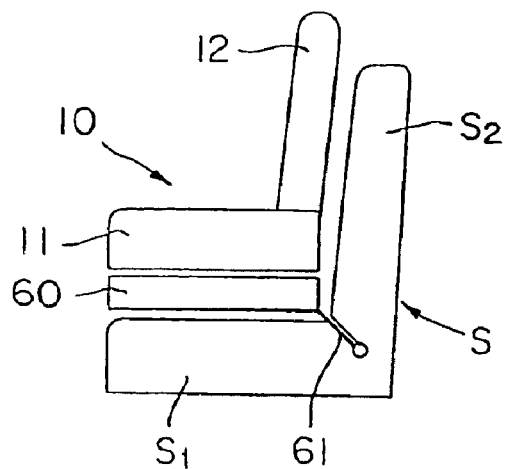

As mentioned above, the child car seat 10 designed to be installed on the seat of a vehicle S (FIGS. 10A and 10B). The child car seat 10 must be fixed on the seat S.

Two straps 40 are extended from the front end 47 of the seat bottom 11 through a recess 53 formed in the bottom surface 49 of the seat bottom 11 toward the back end 48 of the seat bottom 11.

The recess 53 of the seat bottom 11 has a relatively shallow first section 53a and a comparatively deep second section 53b. The straps 40 are extended through the second section 53b and a cover 45 is fitted in the first section 53a to hold the straps 40 in the second section 53b.

An anchoring member 42 is connected to back end parts of the straps 40. The anchoring member 42 is inserted into the seat of a vehicle S. More specifically, the anchoring member 42 is thrust into the joint of the seat bottom $S_1$ and the seat back $S_2$ of the seat S to hold the child car seat 10 fixedly on the seat S.

Figure 9A:
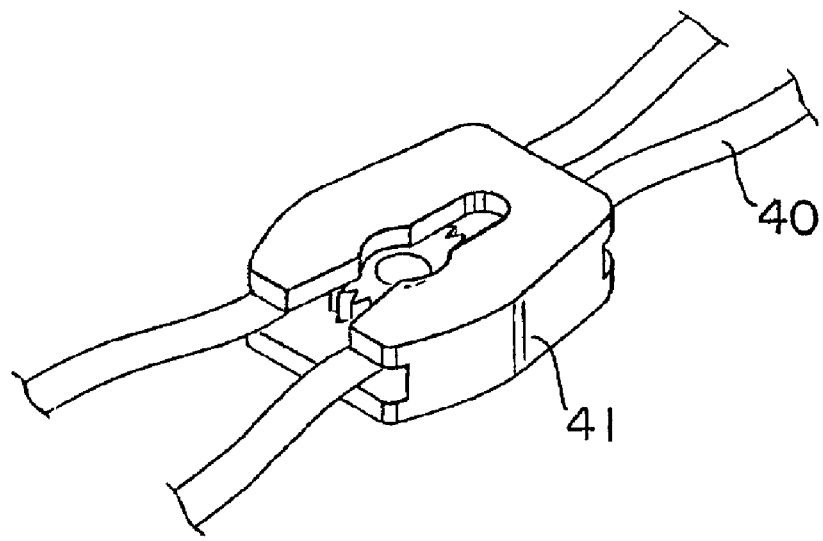
FIGS. 9A and 9B are perspective view and a sectional view, respectively, of a strap and a strap tightening device.
Figure 9B:
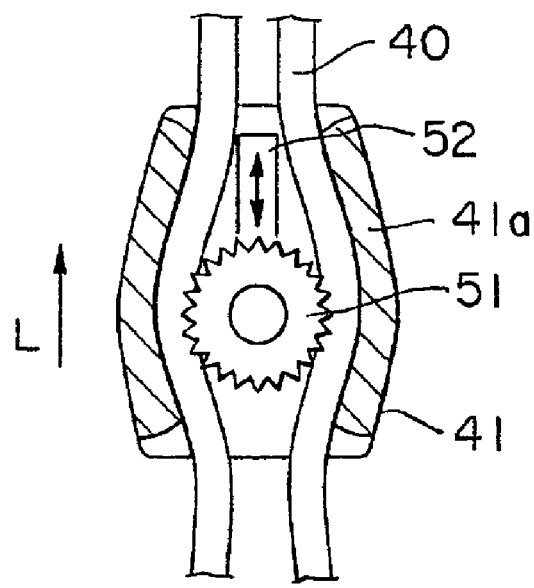

A strap tightening device 41 is connected to front end parts of the straps 40. As shown in FIGS. 9A and 9B, the strap tightening device 41 has a body 41a provided with a guide groove 52, and a clamping member 51 which slides on the body 41a along the guide groove 52. When the strap tightening device 41 is moved in the direction of the arrow L shown in FIG. 9B, the clamping member 51 moves down, as viewed in FIG. 9B, relative to the body 41a to permit the straps 40 to move relative to the strap tightening device 41. When the strap tightening device 41 is moved in a direction opposite the direction indicated by the arrow L, the clamping member 51 moves up, as viewed in FIG. 9B, relative to the body and the teeth of the clamping member 51 engage with the straps 40 to prevent the straps 40 from moving relative to the strap tightening device 41.

A step 50 is formed in the front end 47 of the seat bottom 11. The strap tightening device 41 engages the step 50 and is held fixedly on the step 50. A metal member 46 is put on a part of the bottom wall of the seat bottom 11 between the step 50 and the recess 53 to bear the strap tightening device 41. A recess 43 is formed in the bottom surface 49 of the seat bottom 11 in a part near the recess 53 to house the anchoring member 42 therein.

The operation of the child car seat in the first embodiment thus constructed will be described.

A case where the child car seat 10 is installed directly on the seat of a vehicle S will be described. As shown in FIG. 10A, the seat S has the seat bottom $S_1$ and the seat back $S_2$.

Referring to FIG. 10A, the seat bottom 11 of the child car seat 10 is mounted on the seat bottom $S_1$. The strap tightening device 41 is moved toward the front relative to the straps 40 to move the strap tightening device 41 away from the seat bottom 11. Consequently, the straps 40 can be pulled out of the seat bottom 11 toward the back to move the anchoring member 42 away from the seat bottom 11.

Then the anchoring member 42 is thrust in the joint of the seat bottom $S_1$ and the seat back $S_2$ of the seat S so that the anchoring member 42 is held between the seat bottom $S_1$ and the seat back $S_2$. Subsequently, the strap tightening device 41 is slid along the straps 40 toward the seat bottom 11. The strap tightening device 41 is moved gradually in the direction of the arrow L (FIGS. 9A and 9B). The strap tightening device 41 thus moved in the direction of the arrow L is restrained from moving in the direction opposite the direction indicated by the arrow L.

The strap tightening device 41 is moved further along the straps 40 in the direction of the arrow L and is engaged with the step 50 of the seat bottom 11. Thus, the straps 40 between the seat bottom 11 and the anchoring member 42 is taken up to tighten the straps 40. Consequently, the seat bottom 11 can be firmly secured on the seat S by the straps 40.

When installing the child car seat 10 on an ISO base 60 mounted on the seat S as shown in FIG. 10B, the ISO base 60 is fixed on the seat S by a fixing rod 61, and the child car seat 10 is held by a fixing mechanism, not shown, on the ISO base 60. Thus, the child car seat 10 does not need to be fixed by the straps 40 when the same is mounted on the ISO base 60. When the child car seat 10 is thus used in combination with the ISO base 60, short lengths of the straps 40 are extended behind the seat bottom 11 and the anchoring member 42 is kept in the recess 43. Thus the anchoring member 42 is kept in the recess 43 when the straps 40 are not used to prevent the anchoring member 42 from being mischievously handled by the child K.

Figure 11A:
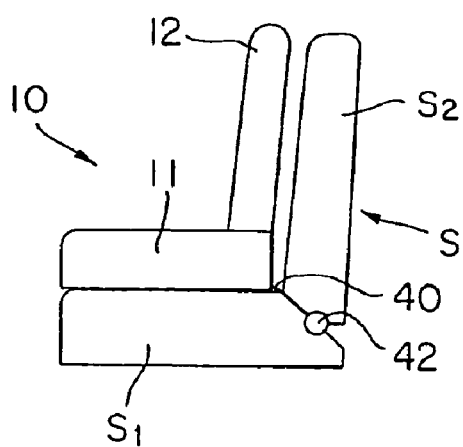
FIGS. 11A and 11B are schematic views of assistance in explaining a method of installing a child car seat in a comparative example.
Figure 11B:
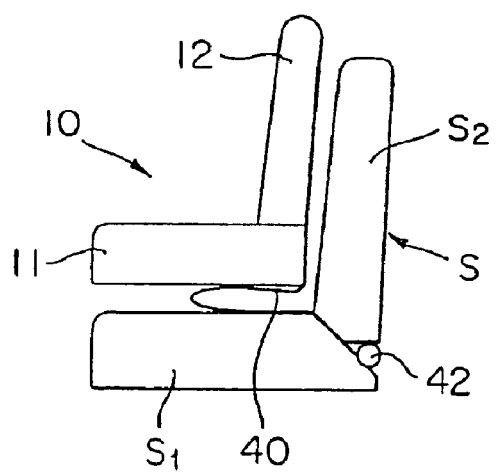
Figure 12:
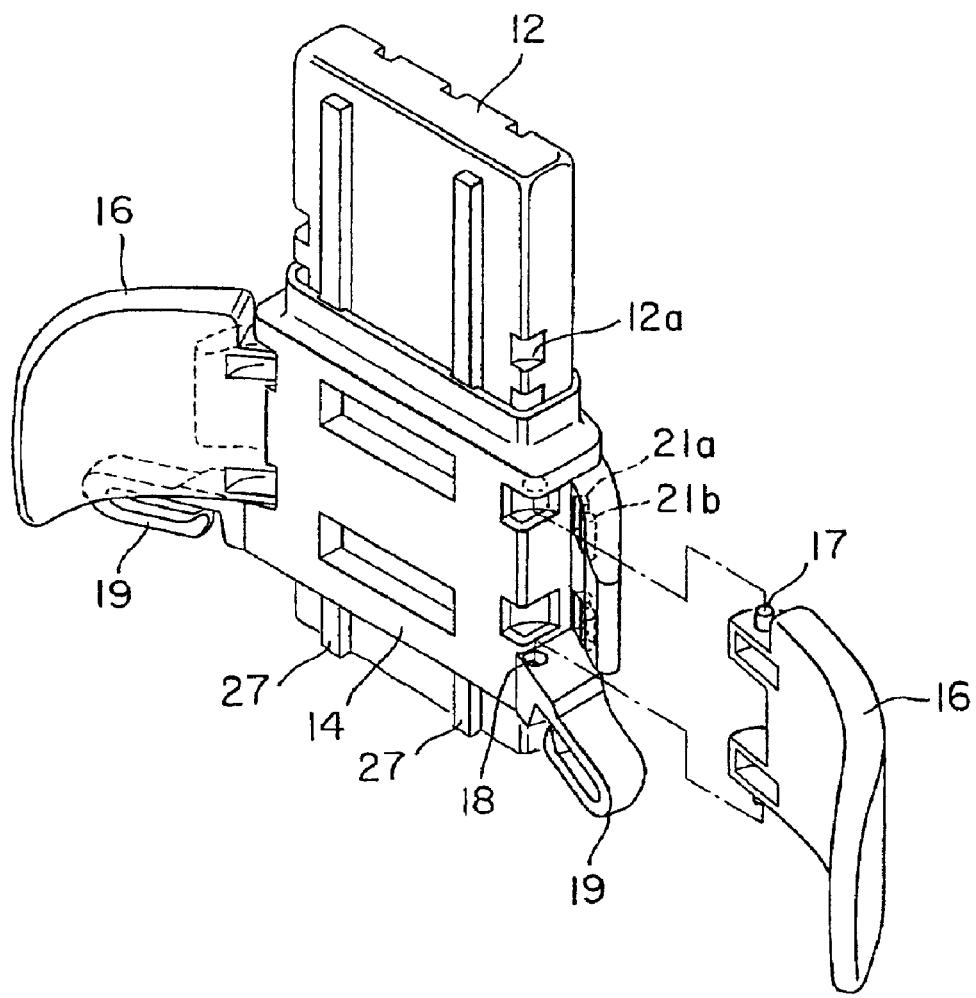
FIG. 12 is a fragmentary perspective view of a child car seat in a second embodiment according to the present invention.

A child car seat in a comparative example provided with straps 40 having an unadjustable length will be described with reference to FIGS. 11A and 11B. If the unadjustable length of the straps 40 is excessively short, it is difficult to thrust an anchoring member 42 attached to the straps 40 in the seat S of the vehicle (FIG. 11A). On the other hand, although the anchoring member 42 can be thrust in the seat S when the unadjustable length of the straps 40 is long, the straps 40 remain slack and a seat bottom 11 cannot be fixed on the seat S (FIG. 11B).

Since the working length of the straps 40 of the child car seat 10 in the first embodiment can be adjusted by adjusting the position of the strap tightening device 41 on the straps 40. Consequently, the anchoring member 42 can be easily thrust in the joint of the seat bottom $S_1$ and the seat back $S_2$ of the seat of a vehicle S, and the straps 40 can be tightened to fix the seat bottom 11 securely on the seat S.

As apparent from the foregoing description, the straps extending from the seat bottom can be adjusted by means of the strap tightening device and hence the anchoring member can be easily thrust in the seat of the vehicle, and the straps can be tightened to fix the seat bottom securely on the seat.

Second Embodiment

A second embodiment according to the present invention will be described with reference to FIGS. 12 and 13A to 13C, in which parts like or corresponding to those of the first embodiment are denoted by the same reference characters and the detailed description thereof will be omitted. The second embodiment relates particularly to the construction of a headrest and side supports.

Referring to FIGS. 12 and 13A to 13C, side supports 16 are connected to the opposite side parts of a headrest 14 provided on a seat back 12. The side supports 16 have base end portions 16b provided with stopping parts 16a, respectively. The stopping parts 16a engage in positioning grooves 12a formed in the opposite side parts of the seat back 12, respectively.

Each side support 16 is provided with pivots 17 which are fitted in holes 18 formed in the headrest 14 to support the side support 16 pivotally on the headrest 14.

The base end portions 16b of each side support 16 is provided with a positioning projection 20, and the headrest 14 is provided with positioning recesses 21a and 21b.

The positioning recesses 21a and 21b are formed in each of the opposite side parts of the headrest 14. The positioning projection 20 is engaged in the positioning recess 21a to hold the side support 16 for a normal mode. The positioning projection 20 is engaged in the positioning recess 21b to hold the side support 16 for a sleeping mode.

The operation of the child car seat in the second embodiment will be described.

The headrest 14 is put on the seat back 12. The headrest 14 can be easily slid along the seat back 12 to adjust the position thereof properly.

Figure 13C:
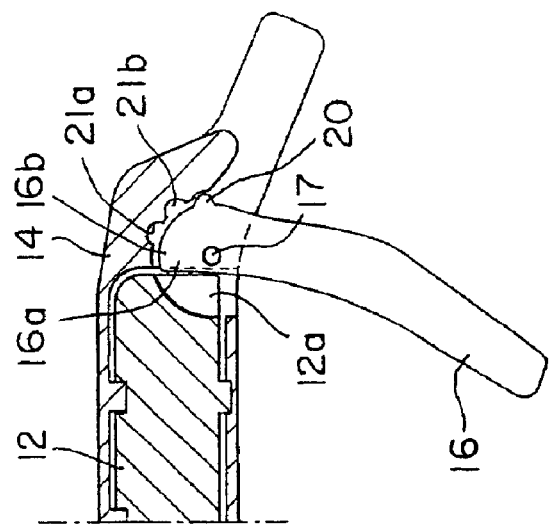
FIGS. 13A to 13C are views of assistance in explaining a connecting structure for connecting a seat back, a headrest and a side support.
Figure 13B:
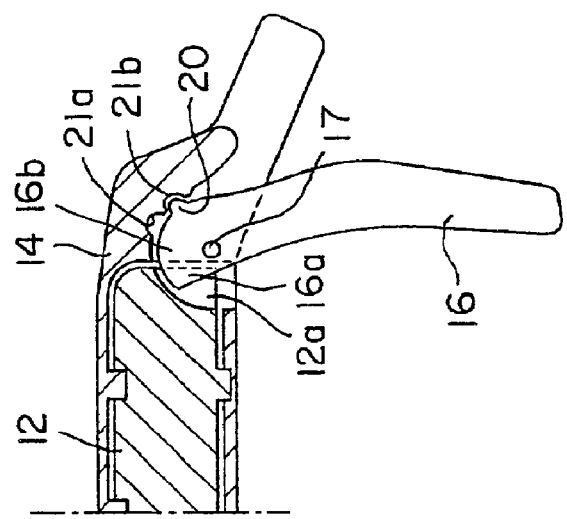
Figure 13A:
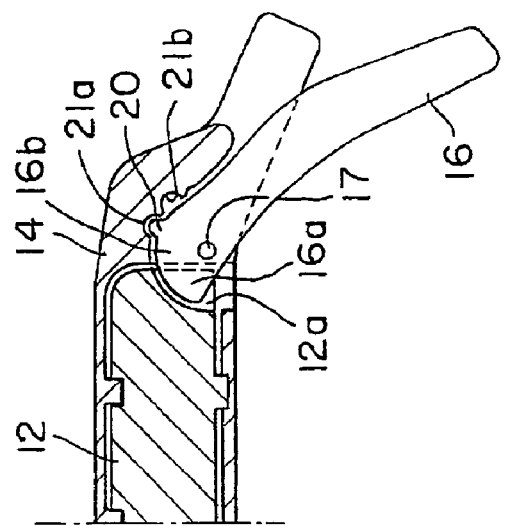
Figure 14A:
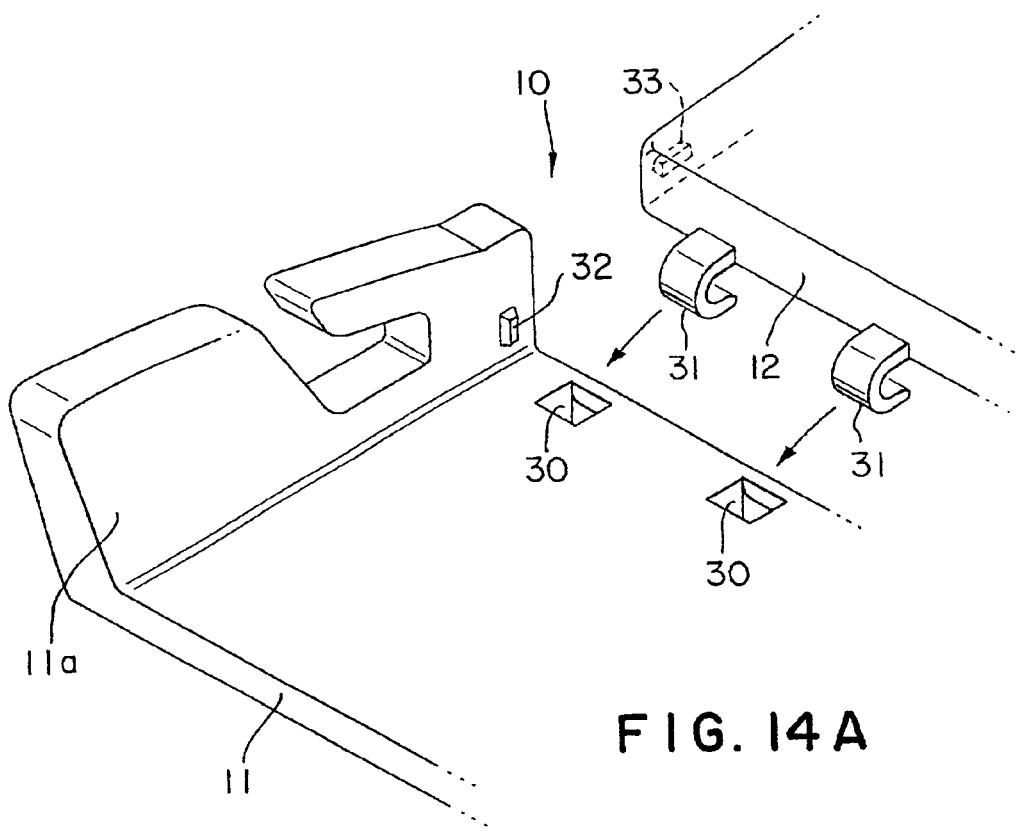
FIGS. 14A and 14B are a fragmentary perspective view and a fragmentary side elevation, respectively, of a connecting structure for connecting a seat bottom and a seat back included in a child car seat in a third embodiment according to the present invention.
Figure 14B:
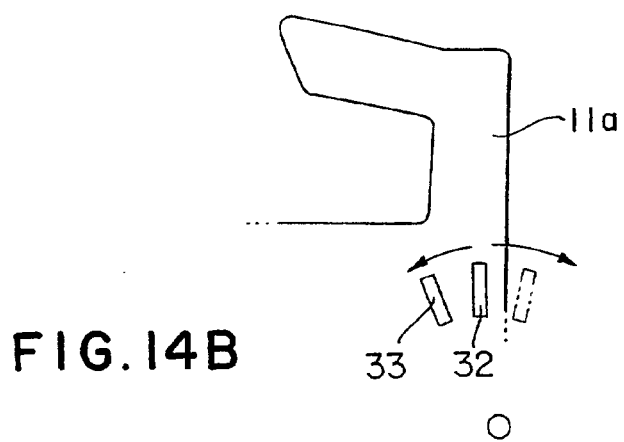

When the child car seat is used in the normal mode, in which the child K is awake, the side supports 16 are turned outward relative to the headrest 14 and the positioning projections 20 of the side supports 16 are engaged in the positioning recesses 21a of the headrest 14 as shown in FIG. 13A.

In this state, the stopping parts 16a formed on the base end portions 16b of the side supports 16 are engaged in the stopping grooves 12a of the seat back 12. Thus, the positioning projections 20 engaged in the positioning recesses 21a holds the side supports 16 fixedly at an open position on the headrest 14, and the stopping parts 16a of the side supports 16 engaged in the stopping grooves 12a of the seat back 12 in order to restrain the headrest 14 and the side supports 16 from sliding along the seat back 12.

When the child car seat is used in the sleeping mode, in which the child K is asleep, the side supports 16 are turned inward relative to the headrest 14 and the positioning projections 20 of the side supports 16 are engaged in the positioning recesses 21b of the headrest 14 as shown in FIG. 13B. In this state, the stopping parts 16a of the side supports 16 remain engaged in the stopping grooves 12a of the seat back 12.

When adjusting the position of the headrest 14 on the seat back 12, the side supports 16 are turned further inward to a position where the positioning projections 20 of the side supports 16 is engaged in neither the positioning recess 21a nor 21b. In this case, the stopping parts 16a of the side supports 16 are disengaged from the stopping grooves 12a of the seat back 12 as shown in FIG. 13C. Consequently, the headrest 14 and the side supports 16 are free to slide together along the seat back 12 for positional adjustment.

Then, the side supports 16 are turned to the position shown in FIG. 13A for the normal mod or the position shown in FIG. 13B for the sleeping mode. Thus, the headrest 14 and the side supports 16 can be accurately positioned and fixed in place relative to the seat back 12 by engaging the stopping parts 16a of the side supports 16a in the stopping grooves 12a of the seat back 12.

As apparent from the foregoing description, in the second embodiment, the headrest can be slid along the seat back when the side supports are turned so as to disengage the stopping parts of the side supports from the stopping grooves of the seat back and can be fixed when the side supports are turned so as to engage the stopping parts of the side supports in the stopping grooves of the seat back. Thus the positional adjustment of the headrest can be easily and surely achieved.

The engagement of the positioning projections of the side supports in the positioning recesses of the headrest for the normal mode or the sleeping mode, and the fixation of the headrest to the seat back can be simultaneously achieved. Thus, the faulty use of the child car seat can be avoided.

Third Embodiment

A third embodiment of the present invention will be described with reference to FIGS. 14A, 14B and 15A to 15C in which parts like or corresponding to those of the first embodiment shown in FIGS. 1 to 11 are denoted by the same reference characters and the detailed description thereof will be omitted. The third embodiment relates particularly to a connecting structure for connecting a seat bottom and a seat back.

Referring to FIGS. 14A, 14B and 15A to 15C, a seat bottom 11 has side walls 11a. A seat back 12 is connected to the seat bottom 11 so as to be turnable relative to the seat bottom 11. The seat bottom 11 is provided in its bottom wall with slots 30. The seat back 12 is provided with connecting projections 31. The connecting projections 31 are engaged in the slots 30 to connect the seat back 14 to the seat bottom 11 so as to be turnable relative to the seat bottom 11.

A first projection 32 facing the seat back 12 is formed on a side of the side wall 11a of the seat bottom 11. A second projection 33 is formed in a side surface of the seat back 12 at a position corresponding to the first projection 32 of the seat bottom 11. The second projection 33 is engaged with the first projection 32 to determine a limit working angle of the seat back 12 to the seat bottom 11.

The limit working angle is the angle of the seat back 12 with respect to the seat bottom 11 within which the safety use of the child car seat is insured.

The operation of the third embodiment will be described with reference to FIGS. 15A to 15C.

A seat of a vehicle S has a seat bottom $S_1$ and a seat back $S_2$. The child car seat 10 is installed on the seat S.

When installing the child car seat 10 on the seat S, the user turns the seat back 12 toward the seat bottom 11 by hand. The second projection 33 come into engagement with the first projection 32 and then climbs over the first projection 32. When the second projection 33 climbs over the first projection 32, the user's hand senses a resistance and the user hears a click sound. The angle of the seat back 12 to the seat bottom 11 enters the range of working angle at this moment.

Figure 15A:
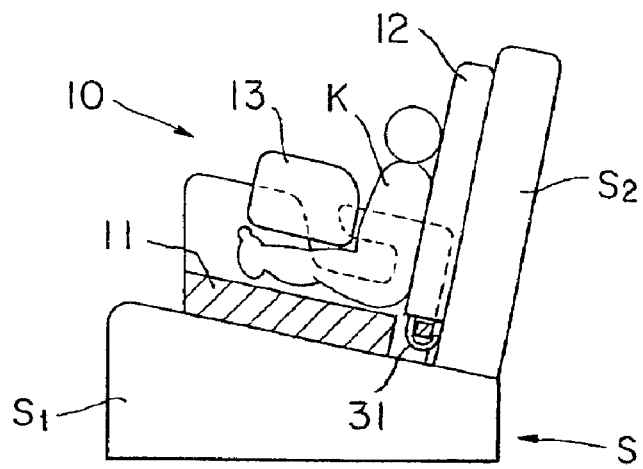
FIGS. 15A to 15C are typical views of assistance in explaining work for installing a child car seat on a seat of a vehicle.
Figure 15B:
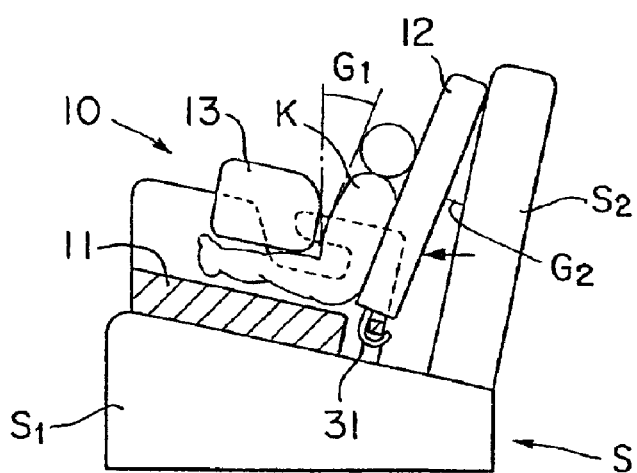
Figure 15C:
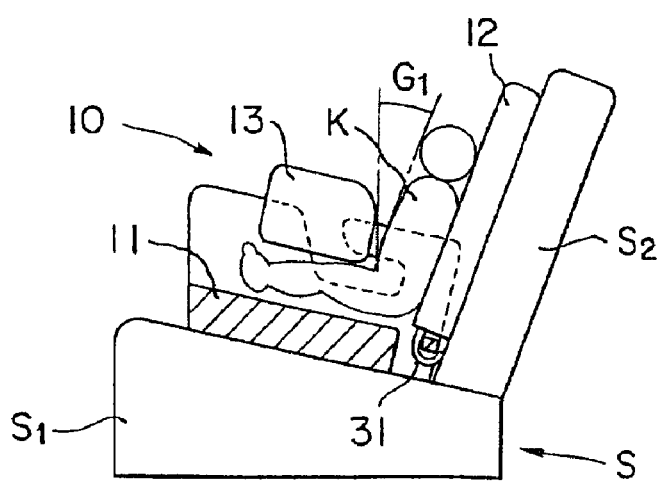

Then as shown in FIG. 15A, the seat bottom 11 of the child car seat 10 is mounted on the seat bottom $S_1$, with the seat back 12 being in contact with the seat back $S_2$ of the seat S, and the seat back $S_2$ of the seat S is set at a predetermined angle with respect to the seat bottom $S_1$. Thus the child car seat 10 can be installed correctly on the seat S. In this state, the first projection 32 and the second projection 33 are disengaged and the seat back 12 is in the range of working angle.

The first projection 32 of the seat bottom 11, and the second projection 33 of the seat back 12 prevent the incorrect installation of the child car seat 10.

If the first projection 32 and the second projection 33 are not formed in the seat bottom 11 or the seat back 12, respectively, the range of working angle of the seat back 12 with respect to the seat bottom 11 is unknown. Consequently, it is possible that the seat bottom 11 is shifted forward from the correct position on the seat bottom $S_1$ and the seat back 12 is inclined excessively at an angle beyond the limit of working angle as shown in FIG. 15B. If the seat back 12 is thus inclined at an improper angle with respect to the seat bottom 11, a space $G_1$ is formed between the child K and the impact shield 13 and a space $G_2$ is formed between the seat back 12 of the child car seat 10 and the seat back $S_2$ of the seat S, and the child car seat 10 is installed incorrectly on the seat S.

According to the present invention, however, the first projection 32 and the second projection 33 generate a click sound when the seat back 12 is inclined at an excessively large angle with respect to the seat bottom 11 and the second projection 33 climbs over the first projection 32. Thus, the user is able to notice the excessive inclination of the seat back 12 and the incorrect installation of the child car seat 10 and to correct the position of the child car seat 10 on the seat S.

If the seat back $S_2$ is inclined at a large angle with respect to the seat bottom $S_1$ and the child car seat 10 is not provided with the first projection 32 or the second projection 33, it is possible that the seat back 12 is inclined at an angle beyond the limit or working angle to the seat bottom 11. If the seat back 12 is inclined so, a space $G_1$ is formed between the child K and the impact shield 13 as shown in FIG. 15C.

According to the present invention, however, as the child car seat 10 is provided with the first projection 32 and the second projection 33, the user is able to notice the incorrect installation of the child car seat 10 on the seat S from a resistance sensed by the hand and a click sound generated when the second projection 33 climbs over the first projection 32.

Thus, in the child car seat 10 in the third embodiment, the seat bottom 11 is provided with the first projection 32, the seat back 12 is provided with the second projection 33, and the limit of working angle of the seat back 12 with respect to the seat bottom 11 can be determined by the engagement of the first projection 32 and the second projection 33. Therefore the child car seat 10 can be correctly installed on the seat of a vehicle S.

As apparent from the foregoing description, according to the present invention, the seat back can be set at an angle within the limit of working angle with respect to the seat bottom by engaging the first and the second projection. Thus the seat back can be set at an angle within the limit of working angle to the seat bottom without fail.

Although the above three embodiments are described independently, of course, the constructions of desirable two embodiments among the three embodiments can be combined, and the constructions of all of the three embodiments can be combined.

What is claimed is:

1. A child car seat to be installed on a seat of a vehicle, comprising:
    a seat bottom to be set on the seat of a vehicle,
    a seat back connected to the seat bottom and capable of turning relative to the seat bottom, and
    a strap passing through a recess in a lower central portion of the seat bottom and extending through the recess between a front end and a back end of the seat bottom and provided at a back end with an anchoring member to be inserted into the seat of a vehicle;
    wherein a strap tightening device capable of engaging the seat bottom is slidably connected to a front part of the strap.

2. The child car seat according to claim 1, wherein the strap extends along a back surface of the seat bottom.

3. The child car seat according to claim 1, wherein a stepped part with which the strap tightening device engages is formed in the front end of the seat bottom.

4. The child car seat according to claim 1, wherein the seat bottom is provided with a recess capable of housing the anchoring member therein.

5. The child car seat according to claim 4, wherein the recess is formed in bottom surface of the seat bottom.

6. The child car seat according to claim 1,
    wherein at least one of the side walls of the seat bottom is provided with a first projection facing inwardly toward the seat back, and the seat back is provided with a second projection facing outwardly toward the seat bottom, the second projection capable of engaging the first projection to determine a limit of angle between the seat bottom and the seat back, and
    each of the first and second projections being constructed with a flat planar projected surface, so that when the seat back is turned relative to the seat bottom, the second projection initially moves against and engages with the first projection on one side of the first projection, the second projection then climbs over the first projection, during which time the flat planar projected surfaces of the first projection and the second projection face each other, and finally the second projection moves beyond the first projection to a position on an opposite side of the first projection.

7. The child car seat according to claim 6, wherein the seat bottom is provided with a first slot and a second slot, and the seat back is provided with a first connecting projection and a second connecting projection capable of being engaged, respectively, in the first slot and the second slot of the seat bottom so as to be movable relative to the seat bottom, wherein the first slot and the second slot each are formed with an opening on an upper surface and a back edge of the seat bottom.

8. The child car seat according to claim 6, wherein the flat planar projected-surfaces which are substantially rectangular in shape.

9. The child car seat according to claim 6, wherein the second projection is formed on a central portion of a lower part of a side wall of the seat back.

10. The child car seat according to claim 6, further comprising connecting portions provided on a lower edge of the seat back for engaging with slots provided on a bottom wall of the seat bottom so that the seat back is turnable relative to the seat bottom.

11. A child car seat comprising:
    a seat bottom,
    a seat back connected to the seat bottom and capable of turning relative to the seat bottom,
    a headrest slidably connected to the seat back, and
    a pair of side supports connected to opposite ends of the headrest so as to be turnable;
    wherein a plurality of stopping grooves are formed in opposite sides of the seat back in a vertical arrangement, and each of the side supports has a base end portion provided with stopping parts capable of being engaged in and being disengaged from the stopping grooves.

12. The child car seat according to claim 11, wherein the base end portion of each side support is provided with a positioning projection, and the headrest is provided on the opposite sides with positioning recesses in which the positioning projections of the side supports are engaged.

13. The child car seat according to claim 12, wherein a plurality of positioning recesses are formed on each of the opposite sides of the headrest.

14. The child car seat according to claim 11, wherein the stopping parts of each side support are engaged in the stopping grooves of the seat back when the positioning projection of each side support engages in the positioning recess of the headrest.

15. The child car seat according to claim 11, wherein a strap extends between a front end and a back end of the seat bottom and is provided at the back end with an anchoring member to be inserted into the seat of a vehicle, and
    a strap tightening device capable of engaging the seat bottom is slidably connected to a front part of the strap.

16. The child car seat according to claim 15, wherein the strap extends along a back surface of the seat bottom.

17. The child car seat according to claim 15, wherein a stepped part with which the strap tightening device engages is formed in the front end of the seat bottom.

18. The child car seat according to claim 15, wherein the seat bottom is provided with a recess capable of housing the anchoring member therein.

19. The child car seat according to claim 18, wherein the recess is formed in bottom surface of the seat bottom.

20. The child car seat according to claim 11, wherein the seat bottom is provided with a first projection, and the seat back is provided with a second projection capable of engaging the first projection to determine a limit of angle between the seat bottom and the seat back, and
    the first and second projections are so constructed that when the seat back is turned relative to the seat bottom, the second projection is first engaged with the first projection, and then climbs over the first projection.

21. The child car seat according to claim 20, wherein the seat bottom is provided with slots, and the seat back is provided with connecting projections capable of being engaged in the slots of the seat bottom so as to be movable relative to the seat bottom.

22. The child car seat according to claim 20, wherein the first projection is formed on an inner surface of the seat bottom, and the second projection is formed in an outer surface of the seat back.

* * * * *